(12) United States Patent
Zhou

(10) Patent No.: US 12,475,616 B2
(45) Date of Patent: Nov. 18, 2025

(54) METHOD FOR GRAPH DRAWING, NON-TRANSITORY STORAGE MEDIUM, AND TERMINAL DEVICE

(71) Applicant: NETEASE (HANGZHOU) NETWORK CO., LTD., Zhejiang (CN)

(72) Inventor: Wenchao Zhou, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 249 days.

(21) Appl. No.: 18/249,067

(22) PCT Filed: Feb. 23, 2021

(86) PCT No.: PCT/CN2021/077396
§ 371 (c)(1),
(2) Date: Apr. 14, 2023

(87) PCT Pub. No.: WO2022/077827
PCT Pub. Date: Apr. 21, 2022

(65) Prior Publication Data
US 2023/0410393 A1   Dec. 21, 2023

(30) Foreign Application Priority Data
Oct. 14, 2020   (CN) .......................... 202011097220.2

(51) Int. Cl.
*G06T 11/20*      (2006.01)
*G06F 3/04847*    (2022.01)
(Continued)

(52) U.S. Cl.
CPC ........ *G06T 11/206* (2013.01); *G06F 3/04847* (2013.01); *G06F 3/0488* (2013.01); *G06T 11/001* (2013.01)

(58) Field of Classification Search
CPC .. G06T 11/206; G06T 11/001; G06F 3/04847; G06F 3/0488; G06F 3/0482;
(Continued)

(56) References Cited

U.S. PATENT DOCUMENTS 8,194,089 B1      6/2012  Ante et al.
10,592,097 B2 *   3/2020  Ishihara .............. G06F 3/04842
(Continued)

FOREIGN PATENT DOCUMENTS

CN      101770343 A    7/2010
CN      103916530 A    7/2014
(Continued)

OTHER PUBLICATIONS

Nanots 12 (10 Colored-lines Drawing Demo of NanoTS 23" Touch Screen, YouTube video, https://www.youtube.com/watch?v=qwWyPsRhaT8 Mar. 8, 2012) (Year: 2012).*
(Continued)

*Primary Examiner* — Yu Chen
(74) *Attorney, Agent, or Firm* — Qinghong Xu

(57) ABSTRACT

A method for graph drawing includes: performing graph drawing on a graphical user interface in response to a first touch operation on the graphical user interface, wherein the first touch operation comprises a sliding operation; obtaining a second touch operation on the graphical user interface in response to a dwelling action of the sliding operation; adjusting a drawing parameter and/or switching a drawing function in response to the second touch operation; and continuing to perform the graph drawing on the graphical user interface using the drawing parameter being adjusted and/or the drawing function being switched according to the first touch operation in response to ending of the second touch operation.

18 Claims, 13 Drawing Sheets

(51) Int. Cl.
*G06F 3/0488* (2022.01)
*G06T 11/00* (2006.01)

(58) Field of Classification Search
CPC ....... G06F 2203/04808; G06F 3/04845; G06F 3/0485; G06F 3/04883; G06F 9/451; A63F 13/60; A63F 2300/60
See application file for complete search history.

(56) References Cited

U.S. PATENT DOCUMENTS

| | | | | |
|---|---|---|---|---|
| 2010/0296806 | A1* | 11/2010 | Seo | H04N 23/632 396/236 |
| 2011/0080341 | A1* | 4/2011 | Helmes | G06F 3/041 345/157 |
| 2011/0191723 | A1* | 8/2011 | Wu | G06F 3/04883 715/856 |
| 2013/0016045 | A1* | 1/2013 | Zhao | G06F 3/04883 345/173 |
| 2013/0132904 | A1* | 5/2013 | Primiani | G06F 3/0482 715/834 |
| 2015/0381882 | A1* | 12/2015 | Otani | G06F 3/04847 715/771 |
| 2016/0239128 | A1* | 8/2016 | Zhang | G06F 3/015 |
| 2018/0129729 | A1* | 5/2018 | Moskwinski | G06F 16/9024 |
| 2019/0324621 | A1* | 10/2019 | Maiya | G06F 3/041 |

FOREIGN PATENT DOCUMENTS

| | | | | |
|---|---|---|---|---|
| CN | 109375854 | A | 2/2019 | |
| CN | 111352561 | A | 6/2020 | |
| CN | 111552420 | A | 8/2020 | |
| CN | 109375854 | B * | 9/2020 | .......... G06F 3/0481 |
| CN | 112199030 | A | 1/2021 | |
| JP | 2016162379 | A | 9/2016 | |

OTHER PUBLICATIONS

Staffan Lincoln (Two-Finger Input with a Standard Touch Screen, YouTube video, https://www.youtube.com/watch?v=KoxzkbBI2c0 Jan. 23, 2008). (Year: 2008).*

International Search Report dated Jul. 15, 2021 of International Application No. PCT/CN2021/077396.

1st Office Action dated Aug. 25, 2021 of Chinese Application No. 202011097220.2.

* cited by examiner

METHOD FOR GRAPH DRAWING, NON-TRANSITORY STORAGE MEDIUM, AND TERMINAL DEVICE

CROSS REFERENCE

The present application is a National Stage of International Application No. PCT/CN2021/077396 filed on Feb. 23, 2021, which claims the priority of the Chinese Patent Application No. 202011097220.2, filed on 14 Oct. 2020, entitled "Method for graph drawing, apparatus, storage medium, and terminal device", and all the contents of which are incorporated herein by reference.

TECHNICAL FIELD

The present disclosure relates to the technical field of computers, and in particular, to a method for graph drawing, an apparatus, a storage medium, and a terminal device.

BACKGROUND

During game development, the scene drawing of a game is generally involved. In an operation interface of a terminal device for performing game development, a drawing region for performing graph drawing through a touch operation is generally included, and a developer can perform graph drawing in the drawing region.

It should be noted that the information disclosed in the above background section is used to enhance the understanding of the background of the present disclosure, and thus may include information that does not constitute information of the related art known to those of ordinary skill in the art.

SUMMARY

According to an embodiment of the present disclosure, there is provided a method for graph drawing, where a graphical user interface is obtained by rendering on a display of a terminal device, and the method includes:
  performing graph drawing on the graphical user interface in response to a first touch operation on the graphical user interface, where the first touch operation is a sliding operation;
  obtaining a second touch operation on the graphical user interface in response to a dwelling action of the sliding operation;
  adjusting a drawing parameter and/or switching a drawing function in response to the second touch operation;
  continuing to perform the graph drawing on the graphical user interface using the drawing parameter being adjusted and/or the drawing function being switched according to the first touch operation in response to ending of the second touch operation According to an embodiment of the present disclosure, there is provided a terminal device, including:
  a processor and a memory;
  the memory is configured to store a program and data, and the processor invokes the program stored in the memory to execute the above-mentioned method for graph drawing.

According to an embodiment of the present disclosure, there is provided a non-transitory computer-readable storage medium, a computer-executable instruction is stored in the computer-readable storage medium, and when executed by a processor, the computer-executable instruction is configured to implement the above-mentioned method for graph drawing.

It should be understood that, the above general description and the following detailed description are exemplary and explanatory, and cannot limit the present disclosure.

BRIEF DESCRIPTION OF THE DRAWINGS

The accompanying drawings, which are incorporated in and constitute a part of the description, illustrate embodiments consistent with the present disclosure and, and serve to explain the principles of the present disclosure together with the description.

FIG. 3 (b) is a schematic diagram of a curved point drawn when the anchor type is Curve;

FIG. 4 (b) is a schematic diagram of a curve drawn with a paintbrush;

Figure 1:
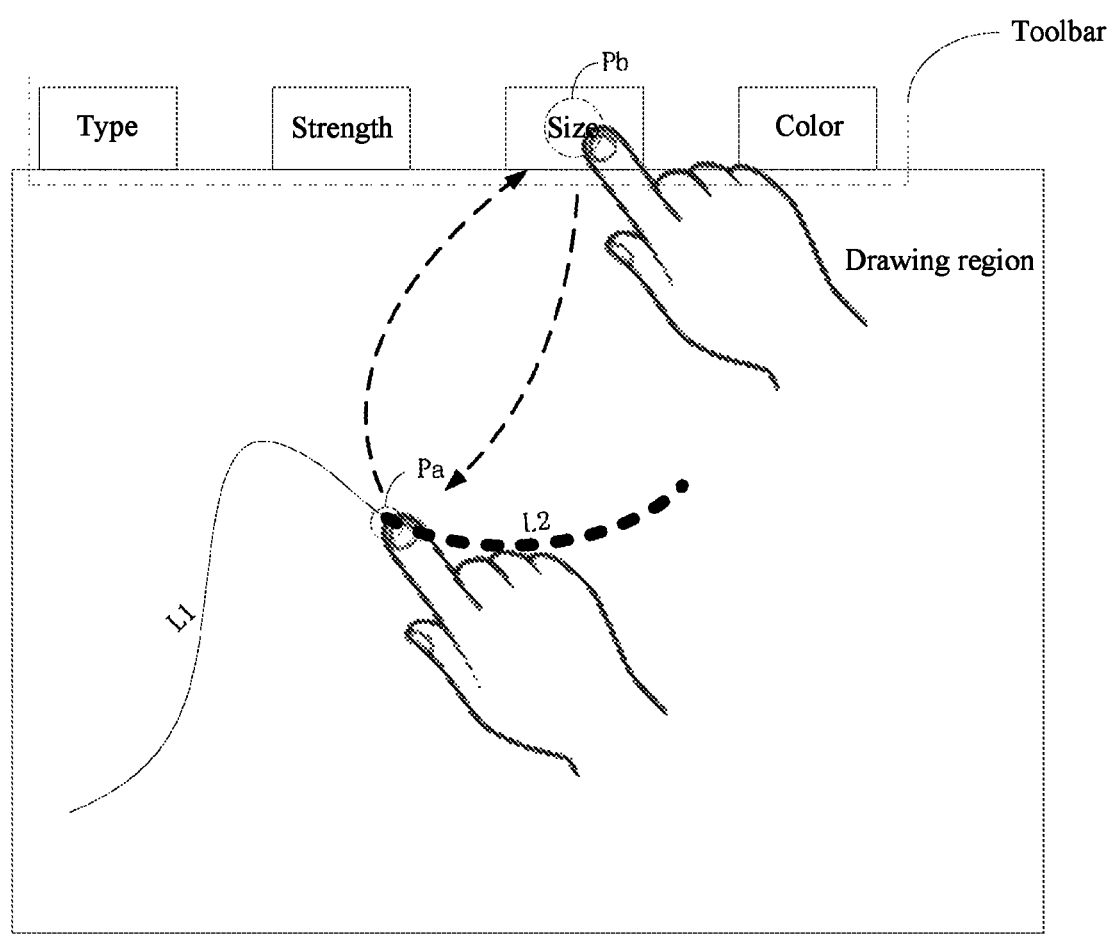
FIG. 1 is a schematic diagram of a user interface including a drawing region in the related art.

Through the above drawings, embodiments defined in the present disclosure have been shown, which will be described in more detail below. These drawings and text descriptions are not intended to limit the scope of the present disclosure in any way, but to describe the concepts of the present disclosure to those skilled in the art by reference to some particular embodiments.

DETAILED DESCRIPTION

In order to make the purpose, technical solution and advantages of the embodiments of the present disclosure clearer, the technical solution in the embodiments of the present disclosure will be described clearly and completely in combination with the drawings in the embodiments of the present disclosure. Obviously, the described embodiments are part of the embodiments of the present disclosure, not all of them. Based on the embodiments in the present disclosure, all other embodiments obtained by ordinary technicians in the art without creative work fall within the scope of protection of the present disclosure.

The terms used in the embodiments of the present disclosure are for the purpose of describing particular embodiments and are not intended to be limiting of the disclosure. The singular forms "a" and "the" used in the embodiments of the present disclosure are also intended to include plural forms, unless other meanings are clearly indicated in the context.

It should be understood that, the term "and/or" used here is an association relationship describing an associated object, and indicates that there may be three relationships, for example, A and/or B may indicate that A exists alone, A and B exist at the same time, and B exists alone. In addition, the character "I" in the description generally indicates that the front-back associated object is a "or" relationship.

Depending on the context, the words "if", "in case" as used here may be interpreted as "at the time "or" when "or" in response to determining "or" in response to detection". Similarly, depending on the context, the phrase "if it is determined" or "if it is detected (stated conditions or events)" may be interpreted as "when it is determined" or "in response to determining" or "when it is detected (stated conditions or events)" or "in response to detection (stated conditions or events)".

It should also be noted that the terms "comprising", "including" or any other variant of them are intended to cover a non-exclusive inclusion, such that a commodity or system including a series of elements includes not only those elements, but also other elements not explicitly listed, or elements inherent to such commodity or system. In the absence of more restrictions, the element defined by the statement "including a . . . " does not exclude the presence of another same element in a commodity or system including the element.

In the related art, the developer usually uses a touch medium to perform graph drawing. Taking the touch medium being a finger as an example, the developer needs to draw in the drawing region through the finger, and when the drawing parameter needs to be adjusted, the developer needs to lift the finger and move the finger to the position of the toolbar for parameter adjustment, and then move the finger back to the drawing region for drawing in the next stage.

However, when the number of parameter adjustment is large, a developer needs to repeatedly move the position of the finger for a plurality of times, so that inconvenience is caused to developers, and the graph drawing efficiency is reduced.

According to some embodiments of the present disclosure, there is provided a method for graph drawing, an apparatus, a storage medium and a terminal device, which are used for solving the problem of low graph drawing efficiency in the related art.

FIG. 1 is a schematic diagram of a user interface (UI) including a drawing region in the related art. As shown in FIG. 1, the UI includes a drawing region and a toolbar, the toolbar includes a control for adjusting parameters of the drawing tools, and a user can perform graph drawing in the drawing region in a touch manner.

For example, after the user draws the curve L1 through a thinner paintbrush, the finger of the user is at the position of point Pa. At this time, the user needs to draw a thicker curve L2, the user needs to move the finger to the position of point Pb to adjust the size parameter, and then move the finger back to the position of point Pa to draw the curve L2.

Due to the fact that the toolbar is usually outside the drawing region, the user needs to interrupt the current drawing operation to adjust the drawing parameters, and when the number of parameter adjustment is large, the developer needs to repeatedly move the position of the finger for a plurality of times, so that inconvenience is brought to developers, and the graph drawing efficiency is reduced.

The method for graph drawing, the apparatus, the storage medium, and the terminal device provided in the present disclosure are intended to solve the above technical problems in the related art. The present disclosure provides a method for graph drawing; in response to a first touch operation on a graphical user interface, graph drawing is performed on the graphical user interface, where the first touch operation is a sliding operation; in response to the dwelling action of the sliding operation, a second touch operation on the graphical user interface is obtained; in response to the second touch operation, the drawing parameter is adjusted and/or the drawing function is switched; and in response to ending the second touch operation, it is continued to perform graphic drawing on the graphical user interface using the drawing parameter being adjusted and/or the drawing function being switched according to the first touch operation. In the present disclosure, when the user performs graphic drawing in the drawing region by the first touch operation and the drawing parameter needs to be adjusted and/or the drawing function needs to be switched, the user can perform parameter adjustment and/or function switching by means of operation dwelling of the first touch operation and performing a second touch operation in the drawing region, and continue to perform graphic drawing using the drawing parameter being adjusted and/or the drawing function being switched by means of the first touch operation after the second touch operation is ended. Through the above processing process, in the process of graph drawing, the user can realize the purpose of adjusting drawing parameters and/or switching painting functions without moving the finger's position, so that the additional operation of the user can be reduced, and the graph drawing efficiency can be improved.

The technical solutions of the present disclosure and how to solve the above technical problems by the technical solutions of the present disclosure will be described in detail below with specific embodiments. The following several specific embodiments may be combined with each other, and the same or similar concepts or processes may not be repeated in some embodiments. The embodiments of the present disclosure will be described below with reference to the accompanying drawings.

It may be understood that the processing steps of the method for graph drawing in the present disclosure may be implemented by a terminal device, and may be a terminal device for performing drawing.

Figure 2:
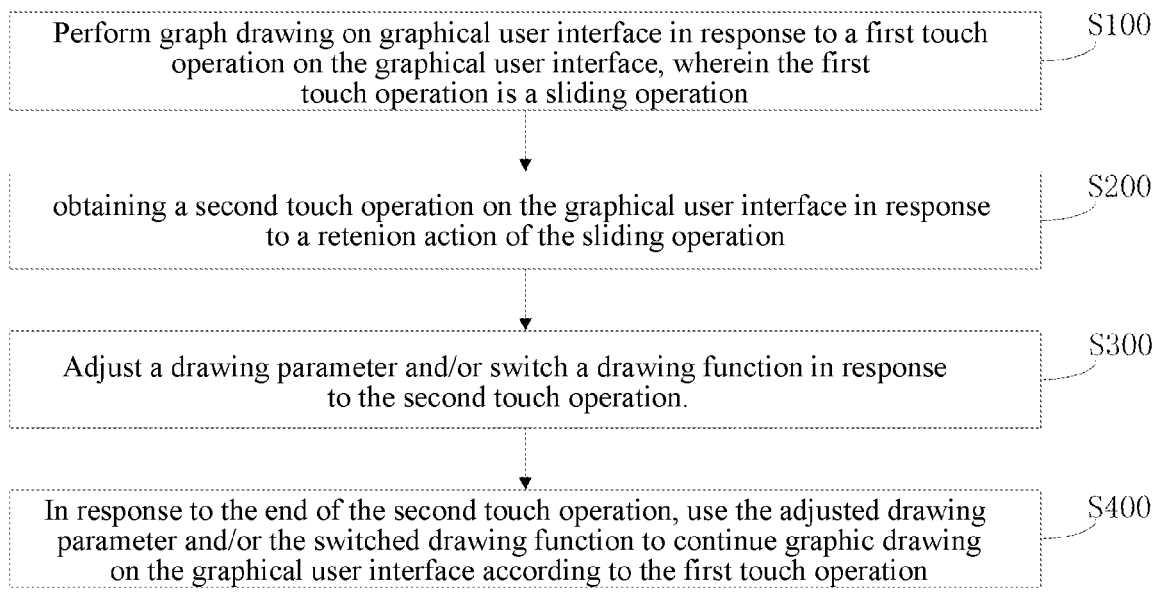
FIG. 2 is a schematic diagram of a method for graph drawing according to an embodiment of the present disclosure.

In some embodiments, there is provided a method for graph drawing. First, a graphical user interface is obtained by rendering on a display of a terminal device. FIG. 2 is a schematic diagram of a method for graph drawing provided by an embodiment of the present disclosure, as shown in FIG. 2, the method mainly includes the following steps.

In S100, graph drawing on is performed on the graphical user interface in response to a first touch operation on the graphical user interface, where the first touch operation is a sliding operation.

In S200, a second touch operation on the graphical user interface is obtained in response to a dwelling action of the sliding operation.

Among them, the first touch operation refers to an operation of performing graph drawing on a drawing region on a graphical user interface by a user in a touch manner, and the second touch operation refers to another touch operation different from the first touch operation when the first touch operation is a dwelling action. For example, a user may perform a first touch operation by means of an index finger, and when the index finger is in a dwelling state, a second touch operation is performed by means of other fingers (such as a middle finger) other than the index finger. Optionally, the second touch operation may include touch operations such as a single click, a double click, a long press, or a repress.

In some embodiments, after it is detected that the first touch operation exists in the drawing region, in response to the first touch operation, graph drawing is performed according to the first touch operation; and after it is detected that the first touch operation is the dwelling action and there is a second touch operation on the drawing region, it is indicated that the current action of the user satisfies the trigger condition of adjusting the drawing parameter and/or switching the drawing function.

In S300, a drawing parameter is adjusted and/or a drawing function is switched in response to the second touch operation.

After the second touch operation of the user is obtained, the drawing parameter is adjusted and/or the drawing function is switched according to the second touch operation.

For example, when the user performs drawing through the index finger, it may be considered that the touch operation corresponding to the index finger is the first touch operation. When the index finger is in the dwelling state and the user performs the touch operation through the middle finger, the touch operation corresponding to the middle finger may be considered as the second touch operation. At this time, the drawing parameter may be adjusted and/or the drawing function may be switched according to the touch operation corresponding to the middle finger.

In S400, in response to ending of the second touch operation, continuing to perform graphic drawing on the graphical user interface using the drawing parameter being adjusted and/or the drawing function being switched according to the first touch operation.

After adjusting the drawing parameter and/or switching the drawing function according to the second touch operation, in response to ending of the second touch operation, it can be considered that the drawing parameter adjustment is completed and/or the drawing function switching is completed. At this time, the drawing parameter of the first touch operation is replaced with the drawing parameter being adjusted, and/or, the drawing function of the first touch operation is replaced with the drawing function being switched, then the touch information of the first touch operation of the user is continuously obtained, and it is continued to perform graph drawing using the drawing parameter being adjusted and/or the drawing function being switched.

According to the method for graph drawing provided by the embodiment, when the user performs graph drawing in the drawing region through the first touch operation and the drawing parameter needs to be adjusted and/or the drawing function needs to be switched, the user can perform parameter adjustment and/or function switching by means of operation dwelling of the first touch operation and performing a second touch operation in the drawing region, and continue to perform graphic drawing using the drawing parameter being adjusted and/or the drawing function being switched by means of the first touch operation after the second touch operation is ended. Through the above processing process, in the process of graph drawing, the user can realize the purpose of adjusting drawing parameters and/or switching painting functions without moving the finger's position, so that the additional operation of the user can be reduced, and the graph drawing efficiency can be improved.

In some embodiments, in the process of adjusting the drawing parameter and/or switching the drawing function, the touch point corresponding to the dwelling action does not displace.

In some embodiments, when the user needs to adjust the drawing parameter and/or switch the drawing function, the first touch operation of the user may be a dwelling action. At this time, the touch point corresponding to the dwelling action does not displace, that is, in the process of adjusting the drawing parameter and/or switching the drawing function, the position of the first touch operation remains unchanged, and the user can adjust the drawing parameter and/or switch the drawing function by means of a second touch operation. Thus, the user's finger does not need to move, and the user can reduce additional operations.

In some embodiments, the adjusting the drawing parameter and/or switching the drawing function in response to the second touch operation includes: adjusting the drawing parameter and/or switching the drawing function in response to the touch information of the second touch operation satisfying a preset trigger condition.

In some embodiments, the preset trigger condition refers to a preset condition for triggering the drawing parameter adjustment and/or the drawing function switching, and when the touch information corresponding to the second touch operation satisfies the preset trigger condition, the drawing parameter adjustment and/or the drawing function switching may be performed. When the touch information corresponding to the second touch operation does not satisfy the preset trigger condition, the drawing parameter adjustment is not performed, and the drawing function switching is not performed.

In this embodiment, by setting the preset trigger condition, the user can perform corresponding touch operation based on the preset trigger condition to adjust the drawing parameter and/or switch the drawing function. In addition, the situation that the drawing parameter is adjusted or the drawing function is switched due to misoperation of the user can be prevented, and the influence of misoperation on drawing by the user is reduced.

In some embodiments, adjusting the drawing parameter includes adjusting at least one of a type parameter, a strength parameter, a size parameter, or a color parameter of the tool used for the graph drawing.

Among them, the type of the tool is, for example, a paintbrush, a brush, an eraser, a specific shape for drawing, etc. The strength may be a drawing strength, and different color depths and the like may be displayed by means of strength. The size refers to the size of the tool, such as the size of the brush, the size of the eraser, etc. The color refers to the color of the drawn pattern.

It may be understood that the drawing parameter may include any one the above, or may be include more than one of the above, and may be determined according to actual situations, which is not limited here.

In this embodiment, the adjusting the drawing parameter includes adjusting at least one of a type parameter, a strength parameter, a size parameter, or a color parameter of the tool used for graph drawing, so that the user can perform corresponding parameter adjustment according to the drawing requirement to meet different drawing requirements.

In some embodiments, switching the painting function includes at least one of: switching on-off state of the stroking function, switching the foreground color or the background color, switching the anchor type, or switching the paintbrush tool.

Figure 3A:
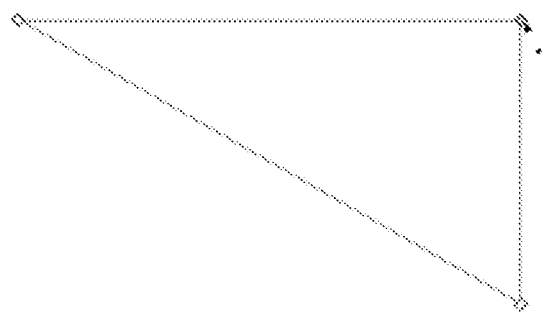
FIG. 3 (a) is a schematic diagram of a sharp point drawn when the anchor type is Sharpen.
Figure 3B:
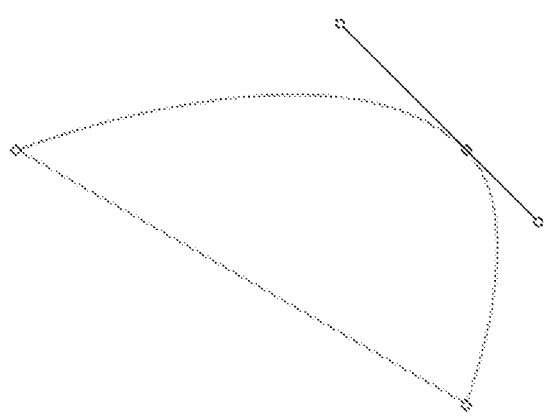

Among them, stroking refers to adding an edge line to the graph; the background color refers to the color of the graph being drawn, and the background color is the ground color of the graph (for example, it is default to be white, etc.); and the switching anchor type may be switching the anchor type of the pen tool, that is, switching the currently drawn point as a sharp point (Sharpen) or a curved point (Curve). For example, FIG. 3 (a) is a schematic diagram of a sharp point drawn when the anchor type is Sharpen, and FIG. 3 (b) is a schematic diagram of a curved point drawn when the anchor type is Curve.

Figure 4A:
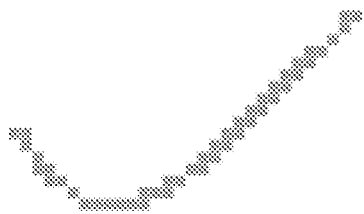
FIG. 4 (a) is a schematic diagram of a curve drawn with a pencil stroke.
Figure 4B:
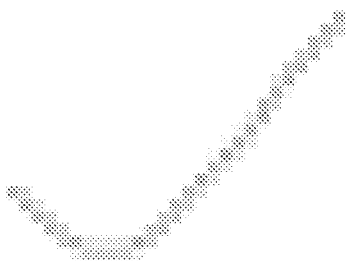

The switching the paintbrush tool may switch a pencil or a paintbrush, where the line drawn by the pencil is a pure pixel point, and the line drawn by the paintbrush has an edge transition, which is closer to a real stylus effect. For example, FIG. 4 (a) is a schematic diagram of a curve drawn by a pencil drawing, and FIG. 4 (b) is a schematic diagram of a curve drawn by a paintbrush.

In this embodiment, the switching of the drawing function includes at least one of: switching the on-off state of the stroking function, switching the foreground color or the background color, switching the anchor type or switching the paintbrush tool, so that the user can perform corresponding function switching according to the drawing requirements so as to satisfy different drawing requirements.

In some embodiments, the touch information includes the number of click, that is, the number of click on the graphical user interface by the second touch operation.

Correspondingly, the preset trigger condition includes that the number of click reaches a preset number of times, that is, when the user performs the second touch operation, the drawing parameter can be adjusted and/or the drawing function can be switched by performing click operations for a preset number of times.

Among them, the user performs click operations for a preset number of times, which may be, for example, performing a single click operation, a double click operation, or a multiple click operation for another number of times.

In some embodiments, when it is confirmed that the finger of the user is in the pressing state on the graphical user interface, the position coordinates of the position point Point1 and the timestamp of the state are recorded. When it is confirmed that the finger of the user is in the lifting state, the position coordinates of the position point Point2 and the timestamp of the state are recorded. If the distance between the position coordinates of the position point Point1 and the position coordinates of the position point Point2 is less than a preset threshold, and the time difference between the timestamp of the position point Point1 and the timestamp of the position point Point2 is less than a preset threshold, it is considered that the user performs an effective click operation at the point Point1 (and the Point2).

In addition, when it is confirmed that the user performs an effective single click operation for the first time, the position coordinates of the position point Point3 and the timestamp of the single click operation are recorded. When it is confirmed that the user performs an effective single click operation for the second time, the position coordinates of the position point Point4 and the timestamp of the single click operation are recorded. If the distance between the position coordinates of the position point Point3 and the position coordinates of the position point Point4 is less than a preset threshold, and the time difference between the timestamp of the position point Point3 and the timestamp of the position point Point4 is less than a preset threshold, it is considered that the single click operations performed by the user at the position point Point3 and Point4 constitutes an effective double click operation.

It can be understood that the recognition principle of multiple click operations is similar to that of the double click operation, and details are not described here again.

Based on the above principle, the number of click of the second touch operation on the graphical user interface may be counted, so as to determine whether the preset trigger condition is satisfied. By setting the preset trigger condition based on the number of click, the situation that the drawing parameter is adjusted or the drawing function is switched due to misoperation of the user can be prevented, and the influence of misoperation on the drawing of the user is reduced.

In some embodiments, the touch information includes a pressing time, that is, a pressing time of the second touch operation on the graphical user interface.

Correspondingly, the preset trigger condition includes that the pressing time reaches the preset duration, that is, when the user performs the second touch operation, the drawing parameter can be adjusted and/or the drawing function can be switched by performing the pressing operation for the preset duration.

In some embodiments, when it is confirmed that the user's finger is in a pressing state, the position coordinates of the position point Point5 and the timestamp of the state are recorded. When it is confirmed that the user's finger is in a lifting state, the position coordinates of the position point Point6 and the timestamp of the state are recorded. If the distance between the position coordinates of the position point point5 and the position coordinates of the position point Point6 is less than a preset threshold, the time difference between the timestamp of the position point Point5 and the timestamp of the position point Point6 is the pressing time corresponding to the second touch operation.

Based on the above principle, the pressing time of the second touch operation on the graphical user interface may be counted, so as to determine whether the preset trigger condition is satisfied. By setting the preset trigger condition based on the pressing time, the situation that the drawing parameter is adjusted or the drawing function is switched due to misoperation of the user can be prevented, and the influence of misoperation on the drawing of the user is reduced.

In some embodiments, the touch information includes a touch trajectory, that is, a touch trajectory of the second touch operation on the graphical user interface.

Correspondingly, the preset trigger condition includes that the touch trajectory satisfies the preset trajectory, that is, when the user performs the second touch operation, it is needed to first perform the touch operation of the preset trajectory, so as to adjust the drawing parameter and/or switch the painting function.

Among them, the user performing the touch operation of the preset trajectory may be, for example, performing a sliding operation in different directions.

In some embodiments, when it is confirmed that the user's finger is in a pressing state, the position coordinates of the position point Point7 and the timestamp of the state are recorded. When it is confirmed that the user's finger is in a lifting state, the position coordinates of the position point Point8 and the timestamp of the state are recorded. If the distance between the position coordinates of the position point Point7 and the position coordinates of the position point Point8 is greater than a preset threshold, and the time difference between the timestamp of the position point Point7 and the timestamp of the position point Point8 is greater than a preset threshold, it is considered that the user performs a sliding operation between the point Point7 and the Point8.

It can be understood that the sliding operation may be a transverse sliding, such as sliding leftward or rightward, or a longitudinal sliding, for example, sliding upward or downward, or sliding in an oblique direction, for example, sliding up to left or sliding down to the right, etc.

In some embodiments, the sliding distance and the sliding direction may be determined based on the position coordinates of the points Point7 and Point8 (right is the positive direction of the X axis, and up is the positive direction of the Y axis in the default position coordinate system).

For example, the sliding distance may be calculated by the following formula:

$$dis=\sqrt{(x7-x8)^2+(y7-y8)^2}$$

Among them, dis is a sliding distance, x7 and y7 are position coordinates of the point Point7, and x8 and y8 are position coordinates of the point Point8.

When x7=x8, or the difference between x7 and x8 is less than the preset threshold, if y7>y8, the sliding direction is downward; If y7<y8, the sliding direction is upward.

If y7=y8, or the difference between y7 and y8 is less than a preset threshold, if x7>x8, the sliding direction is leftward; and if x7<x8, the sliding direction is rightward.

When x7>x8, if y7>y8, the sliding direction is down to left; and if y7<y8, the sliding direction is up to left.

When x7<x8, if y7>y8, the sliding direction is down to right; and if y7<y8, the sliding direction is up to right.

It may be understood that the preset trajectory may also be another shape, for example, an "L" shape, etc. For other shapes, touch trajectory measurement and analysis may be performed based on the coordinates of the touch points at different moments, so as to determine whether a preset trajectory is satisfied.

Based on the above principle, the touch trajectory of the second touch operation on the graphical user interface may be analyzed, so as to determine whether the preset trigger condition is satisfied. By setting the preset trigger condition based on the touch trajectory, the situation that the drawing parameter is adjusted or the drawing function is switched due to misoperation of the user can be prevented, and the influence of misoperation on the drawing of the user is reduced.

In some embodiments, the touch information includes a pressing strength, that is, a pressing strength of the second touch operation on the graphical user interface.

Correspondingly, the preset trigger condition includes that the pressing strength reaches the preset strength, that is, when the user performs the second touch operation, it is needed to perform the touch operation with the preset strength, so as to adjust the drawing parameter and/or switch the drawing function.

In some embodiments, the pressing strength can be detected through the pressing strength sensing structure inside the touch screen, so that the pressing strength of the second touch operation on the graphical user interface is obtained, and whether the pressing strength of the second touch operation reaches the preset strength or not is judged.

Based on the above principle, the pressing strength of the second touch operation on the graphical user interface may be detected, so as to determine whether the preset trigger condition is satisfied. By setting the preset trigger condition based on the pressing strength, the situation that the drawing parameter is adjusted or the drawing function is switched due to misoperation of the user can be prevented, and the influence of misoperation on the drawing of the user is reduced.

In some embodiments, in the process of adjusting the drawing parameter, the method includes: displaying a parameter adjustment control, where the parameter adjustment control is used to indicate an adjustment amplitude of the drawing parameter.

Optionally, when the second touch operation satisfies the preset trigger condition, the displayed parameter adjustment control includes an interactive control, that is, the user may perform a click interaction operation on the parameter adjustment control. In some embodiments, in response to the touch information of the second touch operation satisfying the preset trigger condition, the parameter adjustment control is displayed at the position corresponding to the second touch operation; and in response to the interaction operation instruction performed on the parameter adjustment control by the second touch operation, the drawing parameter being adjusted is determined.

Figure 5:
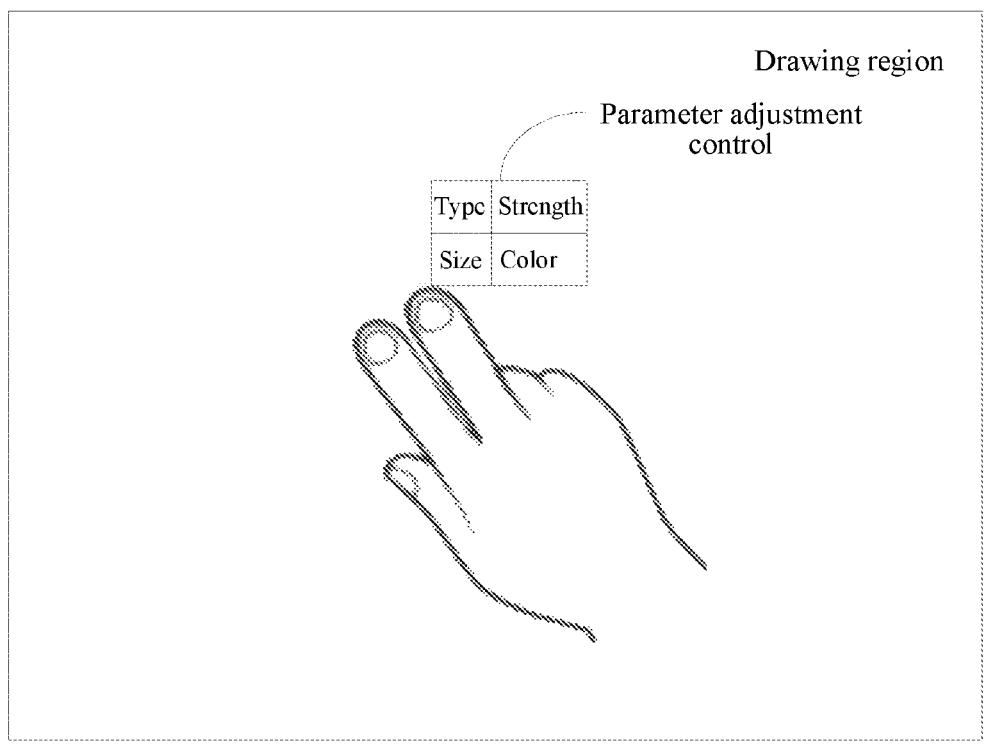
FIG. 5 is a schematic diagram of displaying a parameter adjustment control according to an embodiment of the present disclosure.

FIG. 5 is a schematic diagram of displaying a parameter adjustment control in an embodiment of the present disclosure. As shown in FIG. 5, when touch information of a second touch operation satisfies a preset trigger condition, an interactive parameter adjustment control may be displayed at a position corresponding to the second touch operation, and a user may perform a click interaction operation through the parameter adjustment control, so as to adjust the drawing parameter. When the user performs an interaction operation on the parameter adjustment control through the second touch operation, the corresponding target drawing parameter can be determined by obtaining the corresponding interaction operation instruction.

In some embodiments, when the touch information of the second touch operation satisfies the preset trigger condition, the interactive parameter adjustment control is displayed at the position corresponding to the second touch operation, so that the user can adjust the drawing parameter more conveniently through the second touch operation, and the user can adjust the drawing parameter without moving the finger due to the fact that the parameter adjustment control is close to the position of the first touch operation, so that the drawing efficiency can be improved.

In some embodiments, when the second touch operation satisfies the preset trigger condition, the displayed parameter adjustment control includes a non-interactive control, that is, the user may perform parameter adjustment in any region of the drawing region without defining to perform a click interaction operation on the parameter adjustment control to perform drawing parameter adjustment. When the parameter adjustment control includes a non-interactive control, the non-interactive control may be used to indicate the adjustment amplitude of the drawing parameter.

Figure 6:
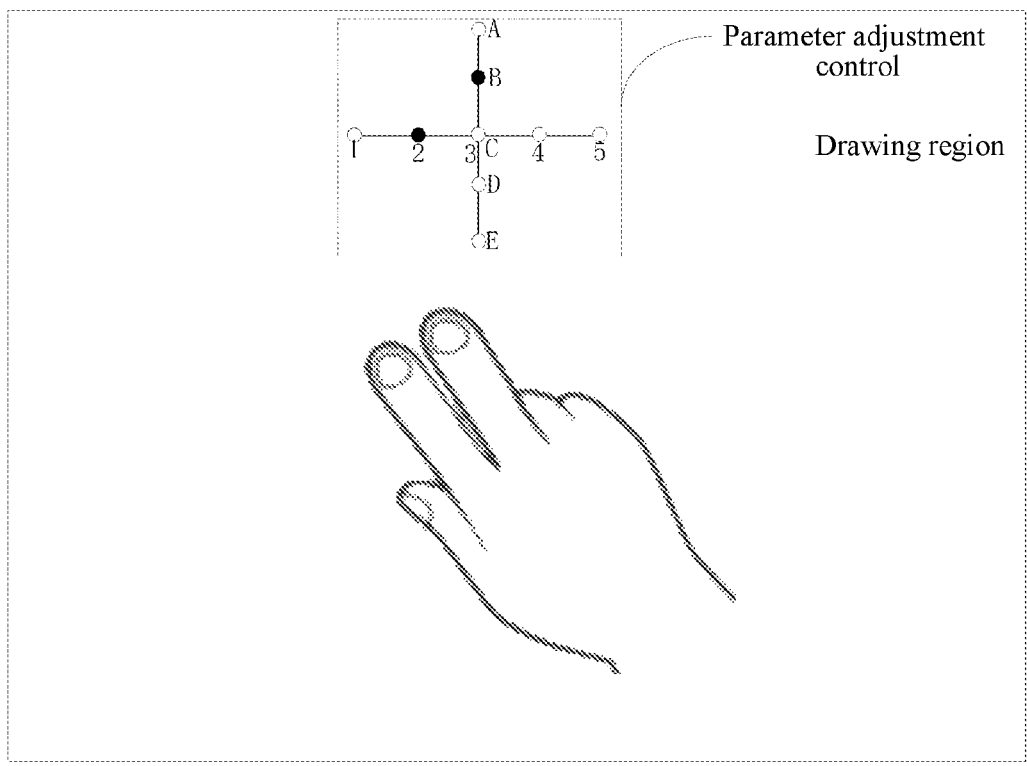
FIG. 6 is another schematic diagram of displaying a parameter adjustment control according to an embodiment of the present disclosure.

FIG. 6 is another schematic diagram of displaying parameter adjustment control according to an embodiment of the present disclosure. As shown in FIG. 6, the display position of the parameter adjustment control is not limited to the position corresponding to the second touch operation, and the parameter adjustment control may be displayed at any position in the drawing region, for example, may be displayed above the second touch operation, thus facilitating user viewing.

In some embodiments, the target drawing parameters including the strength and size of the brush used for graph drawing, are taken as examples to explain. With reference to FIG. 6, the parameter adjustment control includes a horizontal axis representing the brush size, where 1 indicates that the brush size is the minimum, 5 indicates that brush size is the maximum, and the brush size is sequentially increased according to the order of 1 to 5. In addition, the parameter adjustment control further includes a longitudinal axis representing the brush strength, where A indicates that the brush strength is the maximum, E indicates that the brush strength is the minimum, and the brush strength is sequentially reduced according to the order of A to E. In addition, the black dots on the horizontal axis and the longitudinal axis indicate the current brush size or brush strength. For example, the current brush size shown in FIG. 6 is 2, and the brush strength is B level.

In some embodiments, the touch information of the second touch operation includes a touch trajectory, and the touch trajectory includes a sliding direction and a sliding distance.

Figure 7:
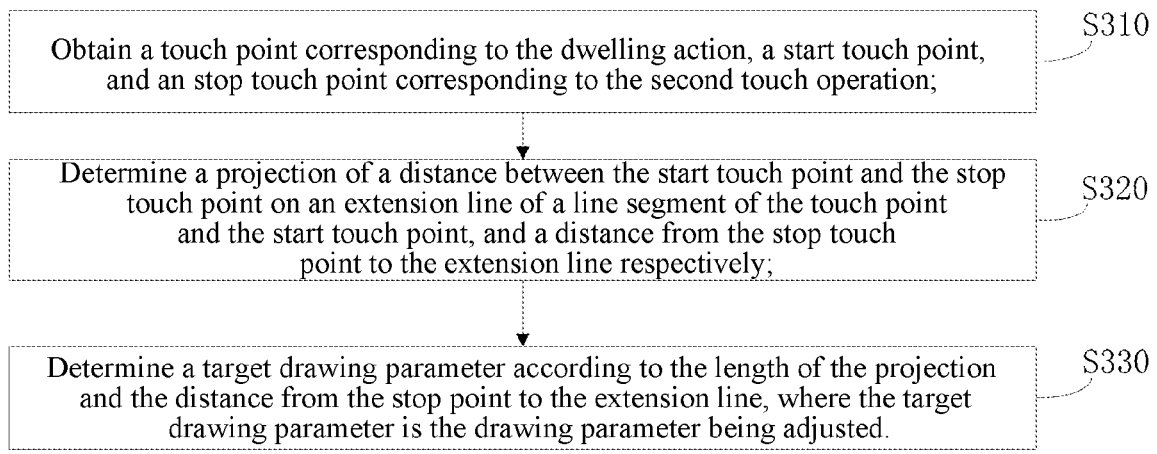
FIG. 7 is a schematic diagram of adjusting a drawing parameter in response to the second touch operation according to an embodiment of the present disclosure.

FIG. 7 is a schematic diagram of adjusting the drawing parameter in response to the second touch operation in an embodiment of the present disclosure. As shown in FIG. 7, the processing flow includes:

In S310, a touch point corresponding to the dwelling action, a start touch point and a stop touch point corresponding to the second touch operation, are obtained;

In S320, a projection of a distance between the start touch point and the stop touch point on an extension line of a line segment of the touch point and the start touch point, and a distance from the stop touch point to the extension line are determined respectively;

In S330, a target drawing parameter is determined according to the length of the projection and the distance from the stop point to the extension line, where the target drawing parameter is a drawing parameter being adjusted.

In some embodiments, the user may adjust the drawing parameters based on the displayed parameter adjustment control through different touch trajectories, that is, adjust the brush size and the brush strength by sliding left and right and sliding up and down through the second touch operation.

Figure 8:
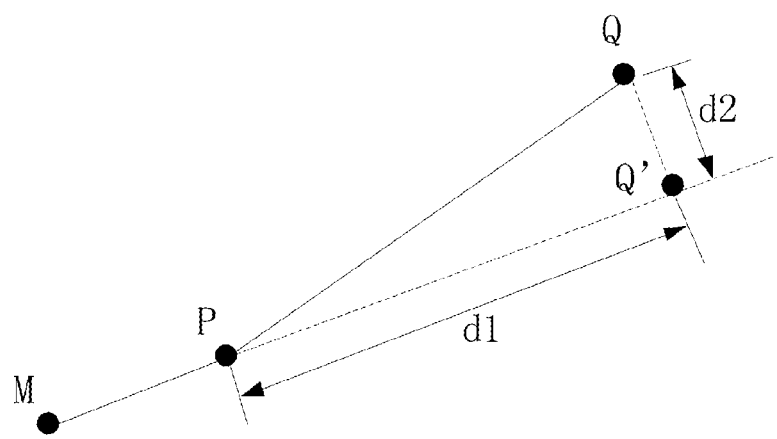
FIG. 8 is an example diagram of determining a target drawing parameter based on touch information according to an embodiment of the present disclosure.

For example, FIG. 8 is an example diagram of determining a target drawing parameter according to touch information in an embodiment of the present disclosure. As shown in FIG. 8, the touch point corresponding to the first touch operation is point M, a start point corresponding to the touch trajectory is point P, and a stop point corresponding to the touch trajectory is point Q.

The projection PQ' of the line segment PQ on the extension line of the line segment MP is determined, the length d1 of the projection PQ' is obtained, the distance d2 from the stop point Q to the extension line is determined, and the distance d1 and the distance d2 represent the adjustment amplitude of the brush size and the adjustment amplitude of the brush strength. Then the target drawing parameter, that is, the target brush size and the target brush strength, is obtained in combination with the current brush size and the current brush strength.

Among them, the distance may be metered by the number of pixels. In some embodiments, level adjustment standard distance of the size and the strength in different levels may be preset, for example, the adjustment standard distance of the adjacent levels is set to be 20 pixels. After the adjustment amplitude of the brush size and the adjustment amplitude of the brush strength are obtained, the adjusted level can be determined in combination with the adjustment standard distance.

For example, if the distance d1 is 40 pixels and the distance d2 is 20 pixels, it can be determined that the adjustment amplitude of the brush size is 40/20=2, that is, two levels are increased, and when the current brush size is level 2, it can be determined that the target brush size is level 4. In addition, it can be determined that the adjustment amplitude of the brush strength is 20/20=1, that is, one level is increased, and when the current brush strength is level B, it can be determined that the target brush strength is level A.

It can be understood that the touch trajectory shown in FIG. 8 is sliding up to right, and the sliding direction may be considered to be a direction for increasing the brush size and the brush strength. In addition, the touch trajectory may also be sliding down to left, and the sliding direction may be considered to be a direction for reducing the brush size and the brush strength.

Figure 9:
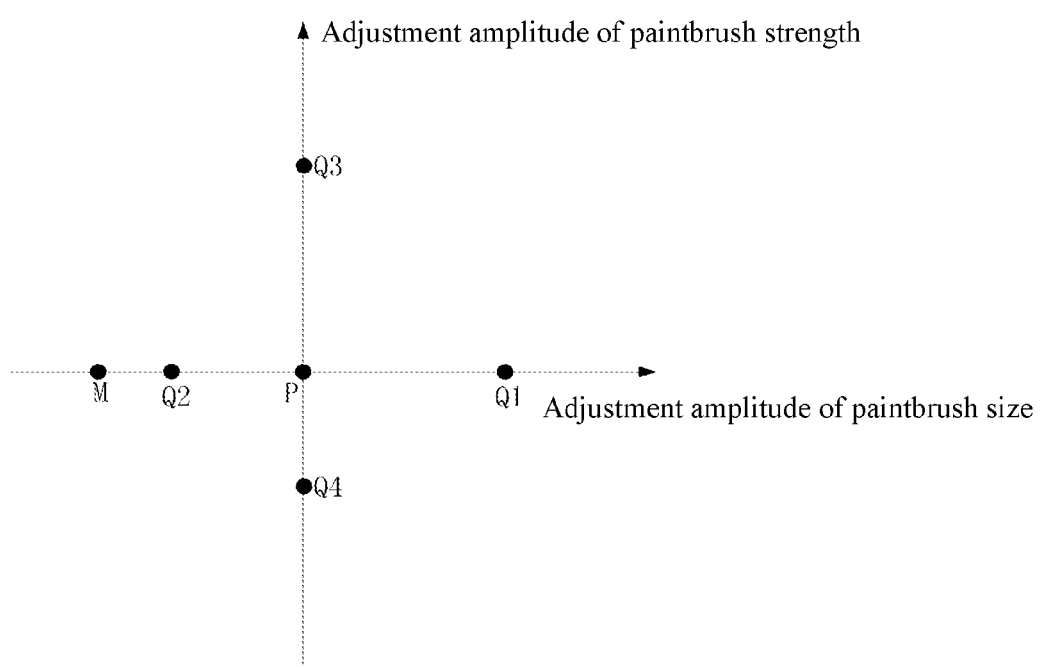
FIG. 9 is a schematic diagram of a relationship between a sliding direction and a drawing parameter adjustment in an embodiment of the present disclosure.

FIG. 9 is a schematic diagram of an adjustment relationship between a sliding direction and a drawing parameter in an embodiment of the present disclosure. As shown in FIG. 9, a coordinate system is established by taking a starting point P as an original point, the horizontal axis represents an adjustment amplitude of the brush size, and the longitudinal axis represents an adjustment amplitude of the brush strength. It can be seen that, when the touch trajectory is sliding rightwards, for example, the stop point corresponding to the touch trajectory is Q1, the adjustment amplitude of the brush size is positive, indicating that the brush size is increased; when the touch trajectory is sliding leftwards, for example, the stop point corresponding to the touch trajectory is Q2, the adjustment amplitude of the brush size is negative, and the brush size is reduced; when the touch trajectory is sliding upwards, for example, the stop point corresponding to the touch trajectory is Q3, the adjustment amplitude of the brush strength is positive, indicating that the brush strength is increased; and when the touch trajectory is sliding downwards, for example, the stop point corresponding to the touch trajectory is Q4, the adjustment amplitude of the brush strength is negative, indicating that the brush strength is reduced.

Thus, the drawing parameters are determined to be increased or reduced according to the sliding direction, and then the corresponding adjustment amplitude is determined in combination with the specific distance, so that the adjustment of the drawing parameters can be realized.

In this embodiment, when the second touch operation satisfies the preset trigger condition, the parameter adjustment control is displayed, so that the user can adjust the drawing parameter through the second touch operation. The user can adjust the drawing parameter through the touch trajectory without moving the position of the finger, so that the drawing efficiency can be improved.

In some embodiments, when a specific state type of a certain drawing function is less, or a specific parameter type of a certain drawing parameter is less, for example, turning on or turning off of some specific drawing functions (such as a stroking function, a foreground and background color interchange function, etc.), or the specific parameters of some specific drawing parameters including the first parameter and the second parameter, or other fewer parameters, the parameter adjustment control does not need to be invoked, but the adjustment of the drawing parameter or switching of the on-state and the off-state of the function are directly performed according to the touch information of the second touch operation.

In this embodiment, the preset trigger condition includes a parameter switching condition, and, in response to the touch information satisfying the parameter switching condition, it is determined that the drawing parameter being switched is the target drawing parameter.

For example, when the drawing function is currently in the first state, or when the drawing parameter is currently the first parameter, the user may switch the current state of the drawing function to the second state, or switch the drawing parameter to the second parameter, when the touch information of the second touch operation satisfies the parameter switching condition. Among them, the first state may be the on-state or the off-state.

It may be understood that, when there are two types of the state or the parameter, the user may directly switch the state or the parameter through the second touch operation. When there are more than two types of the state or the parameter, the user can sequentially switch the state or the parameter according to the second touch operation, for example, when the number of types is 3, the user can switch the state or parameter according to the cyclic sequence of "the first state/parameter—the second state/parameter—the third state/parameter—the first state/parameter" through the second touch operation.

Optionally, the parameter switching condition includes any one of the following: the number of click reaches a preset number; the pressing time reaches a preset duration; the touch trajectory satisfies a preset track; and the pressing strength reaches a preset strength.

For example, for turning-on or turning-off of the stroking function, it can be achieved by determining whether the number of click reaches a preset number or not. For example, when the preset number is set to be twice, if it is determined that the second touch operation of the user includes a double-click operation, the stroking function is turned on; and if the user performs a double-click operation again, the stroking function is turned off. It may be understood that the preset number may also be another number.

For another example, for turning-on or turning-off of the stroking function, it can be achieved by determining whether the pressing time reaches the preset duration or not. For example, when the preset duration is three seconds, if it is determined that the second touch operation of the user includes a pressing operation of more than three seconds, the stroking function is turned on; and if the user performs a pressing operation of more than three seconds again, the stroking function is turned off. It may be understood that the preset duration may also be another duration.

For another example, for turning-on or turning-off of the stroking function, it can be achieved by determining whether the touch trajectory satisfies the preset trajectory or not. For example, when the preset trajectory is sliding to the right, if it is determined that the second touch operation of the user includes an operation of sliding rightwards, the stroking function is turned on; and if the user performs the operation of sliding rightwards again, the stroking function is turned off. It may be understood that the preset trajectory may also be another trajectory.

For example, for turning-on or the turning-off of the stroking function, it can be achieved by determining that the pressing strength reaches the preset strength. For example, when the preset strength is set, if it is determined that the second touch operation of the user includes the touch operation of the preset strength, the stroking function is turned on; and if the user performs the touch operation of the preset strength again, the stroking function is turned off.

It should be noted that, for different drawing parameter adjustment/drawing function state switching, the corresponding parameter switching conditions are different, thus avoiding confusion.

In addition, for a certain drawing parameter adjustment/drawing function state switching, the corresponding parameter switching conditions may be the same or different. For example, if it is determined that the second touch operation of the user includes a double-click operation, the stroking function is turned on; and if it is determined that the second touch operation of the user includes a three-click operation, the stroking function is turned off.

In this embodiment, when the specific state type of a certain drawing function is less, or when the specific parameter type of a certain drawing parameter is less, the user does not need to invoke the parameter adjusting control, but directly perform the drawing parameter adjustment or the switching of the function turn-on state and the turn-off state through the touch information of the second touch operation, so that the operation of parameter adjustment or function turning on or turning off performed by the user is more convenient and faster.

It should be understood that although the steps in the flowchart in the above embodiments are sequentially displayed according to the indication of the arrows, these steps are not necessarily performed sequentially in the order indicated by the arrows. Unless explicitly stated here, the execution of these steps is not strictly limited in order, which may be performed in other orders. Moreover, at least some of the steps in the drawings may include a plurality of sub-steps or a plurality of stages, these sub-steps or stages are not necessarily performed at the same moment, but may be executed at different moments, and the execution sequence of them is also not necessarily performed in sequence, but may be executed in turn or alternately with at least a part of sub-steps or stages of other steps or other steps.

Figure 10:
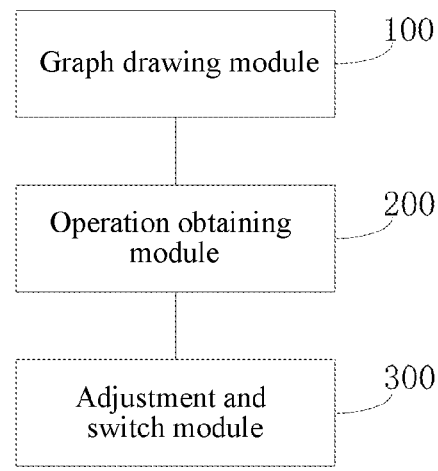
FIG. 10 is a schematic diagram of an apparatus for graph drawing according to an embodiment of the present disclosure.

In some embodiments, there is provided an apparatus for graph drawing, and a graphical user interface is obtained by rendering on a display of a terminal device. FIG. 10 is a schematic diagram of the apparatus for graph drawing according to an embodiment of the present disclosure, as shown in FIG. 10, the apparatus includes:

a graph drawing module 100, configured to perform graph drawing on the graphical user interface in response to a first touch operation on the graphical user interface, where the first touch operation is a sliding operation;

an operation obtaining module 200, configured to perform obtaining a second touch operation on the graphical user interface in response to a dwelling action of the sliding operation;

an adjustment and switch module 300, configured to perform adjusting a drawing parameter and/or switching a drawing function in response to the second touch operation;

the graph drawing module 100 is further configured to perform continuing to perform the graph drawing on the graphical user interface, in response to ending of the second touch operation, using the drawing parameter being adjusted and/or the drawing function being switched according to the first touch operation.

For the specific definition of the apparatus for graph drawing, reference may be made to the definition of the method for graph drawing above, and details are not described here again. The various modules in the apparatus for graph drawing may be implemented in whole or in part by software, hardware, and a combination of them. The foregoing modules may be embedded in or independent of a processor in a terminal device the form of hardware, or may be stored in a memory in a terminal device in the form of software, so that the processor invokes and executes an operation corresponding to each module.

The present disclosure provides an apparatus for graph drawing. When a user performs graph drawing in a drawing region through a first touch operation, and when a drawing parameter needs to be adjusted and/or a drawing function needs to be switched, the user can perform parameter adjustment and/or function switching through a dwelling action of the first touch operation and the second touch operation performed in the drawing region, and after the second touch operation is ended, the user continues to perform graph drawing using the drawing parameter being adjusted and/or the drawing function being switched through the first touch operation. Through the above processing process, the user can adjust the drawing parameter and/or switch the drawing function without moving the finger position, so that the additional operation of the user can be reduced, and the graph drawing efficiency can be improved.

In some embodiments, there is provided a terminal device.

Figure 11:
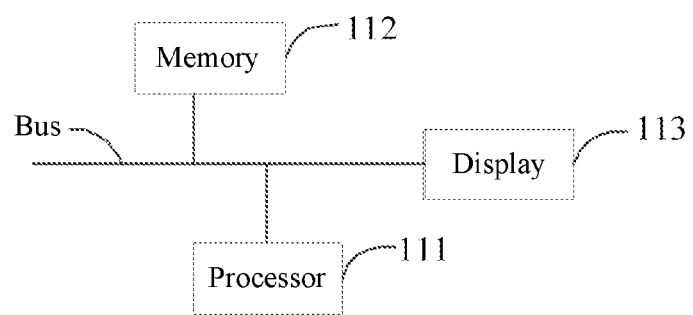
FIG. 11 is a schematic structural diagram of a terminal device according to an embodiment of the present disclosure.

FIG. 11 is a schematic structural diagram of a terminal device according to an embodiment of the present disclosure. As shown in FIG. 11, the terminal device includes a processor 111 and a memory 112.

The memory 112 is configured to store a program and data, and the processor 111 invokes the program stored in the memory to execute the technical solution of any of the foregoing method embodiments.

Optionally, referring to FIG. 11, the terminal device may further include a display 113, and when a user performs graph drawing through the terminal device, the image drawn by the user may be displayed through the display 113.

In the foregoing terminal device, the memory and the processor are electrically connected directly or indirectly, so as to implement data transmission or interaction. For example, the elements may be electrically connected to each other by means of one or more communication buses or signal lines, for example, may be connected by means of a bus. A computer-executable instruction for implementing a data access control method is stored in a memory, and includes at least one software functional module that can be stored in the memory in the form of software or firmware, and the processor executes various functional applications and data processing by running software programs and modules stored in the memory.

The memory may be, but is not limited to, a Random Access Memory (RAM), a Read-Only Memory (ROM), a Programmable Read-Only Memory (PROM), an Erasable Programmable Read-Only Memory (EPROM), an Electrically Erasable Programmable Read-Only Memory (EEPROM), etc. Among them, the memory is used to store the program, and the processor executes the program after receiving the executable instruction. Further, the software programs and modules in the above-mentioned memory can also include an operating system, which can include various software components and/or drivers for managing system tasks (such as memory management, storage device control, power management, etc.), and can communicate with various hardware or software components, so as to provide an operating environment for other software components.

The processor can be an integrated circuit chip with signal processing capability. The above processors can be general-purpose processors, including central processing unit (CPU), network processor (NP), etc. Each method, step and logic block diagram disclosed in the embodiment of the present disclosure can be implemented or executed. The general-purpose processor can be a microprocessor or the processor can also be any conventional processor.

In one embodiment, there is provided a computer-readable storage medium. The computer-readable storage medium stores with computer execution instructions. The computer execution instructions are used to implement the steps of each method embodiment of the present disclosure when they are executed by the processor.

Those skilled in the art can understand that all or part of the processes in the above embodiments can be completed by instructing the relevant hardware through a computer program. The computer program can be stored in a non-volatile computer-readable storage medium. When the computer program is executed, it can include the processes in the above method embodiments. Among them, any reference to memory, storage, database or other medium used in the embodiments provided by the present disclosure can include non-volatile and/or volatile memory. Non-volatile memory may include Read-Only Memory (ROM), Programmable ROM (PROM), Electrically Programmable ROM (EPROM), Electrically Erasable Programmable ROM (EEPROM) or flash memory. Volatile memory may include Random Access Memory (RAM) or external cache memory. As an illustration but not a limitation, RAM is available in many forms, such as static RAM (SRAM), dynamic RAM (DRAM), synchronous DRAM (SDRAM), dual data rate SDRAM (DDRSDRAM), enhanced SDRAM (ESDRAM), synchronous link DRAM (SLDRAM), Rambus direct RAM (RDRAM), direct memory bus dynamic RAM (DRDRAM), and memory bus dynamic RAM (RDRAM), etc.

Those skilled in the art will easily think of other embodiments of the present disclosure after considering the description and the application disclosed here. The present disclosure is intended to cover any variant, use or adaptive change of the present disclosure. These variants, uses or adaptive changes follow the general principles of the present disclosure and include the common knowledge or commonly used technical means in the technical field not disclosed in the present disclosure. The description and embodiments are regarded as illustrative. The true scope and spirit of the present disclosure are indicated by the following claims.

It should be understood that, the present disclosure is not limited to the precise structure described above and shown in the drawings, and various modifications and changes can be made without departing from its scope. The scope of the present disclosure is limited by the appended claims.

What is claimed is:

1. A method for graph drawing, comprising:
performing graph drawing on a graphical user interface in response to a first touch operation on the graphical user interface, wherein the first touch operation comprises a sliding operation, and the first touch operation is performed by a first finger of a user;
obtaining a second touch operation on the graphical user interface in response to a dwelling action of the sliding operation, wherein the second touch operation is performed by a second finger of the user other than the first finger;
adjusting a drawing parameter and/or switching a drawing function in response to touch information of the second touch operation satisfying a preset trigger condition; and continuing to perform the graph drawing on the graphical user interface using the drawing parameter being adjusted and/or the drawing function being switched according to the first touch operation in response to ending of the second touch operation;

wherein, the touch information comprises a touch trajectory;

the adjusting the drawing parameter comprises:

obtaining a touch point corresponding to the dwelling action, a start touch point and a stop touch point corresponding to the second touch operation;

determining a projection of a distance between the start touch point and the stop touch point on an extension line of a line segment of the touch point and the start touch point, and a distance from the stop touch point to the extension line; and determining a target drawing parameter according to a length of the projection and the distance from the stop touch point to the extension line, wherein the target drawing parameter is the drawing parameter being adjusted.

2. The method according to claim 1, wherein in process of adjusting the drawing parameter and/or switching the drawing function, a touch point corresponding to the dwelling action does not displace.

3. The method according to claim 1, wherein the touch information comprises at least one of: a number of click, a pressing time, a touch trajectory, or a pressing strength.

4. The method according to claim 3, wherein the touch trajectory comprises a sliding direction and a sliding distance.

5. The method according to claim 4, wherein the adjusting the drawing parameter comprises:

determining that the drawing parameter is to be increased or reduced according to the sliding direction.

6. The method according to claim 5, wherein the adjusting the drawing parameter further comprises:

determining corresponding adjustment amplitude in combination with the sliding distance.

7. The method according to claim 1, wherein the adjusting the drawing parameter comprises: adjusting at least one of a type parameter, a strength parameter, a size parameter, or a color parameter of a tool used for graph drawing.

8. The method according to claim 1, wherein the switching the drawing function comprises at least one of: switching on-off state of a stroking function, switching foreground color or background color, switching an anchor type, or switching a paintbrush tool.

9. The method according to claim 1, wherein the preset trigger condition comprises any one of following: the number of click reaching a preset number the pressing time reaching a preset duration; the touch trajectory satisfying a preset track; or the pressing strength reaching a preset strength.

10. The method according to claim 7, wherein the adjusting the drawing parameter further comprises: displaying a parameter adjustment control, wherein the parameter adjustment control is used to indicate an adjustment amplitude of the drawing parameter.

11. The method according to claim 10, wherein the parameter adjustment control comprises an interactive control or a non-interactive control.

12. The method according to claim 1, wherein the adjusting the drawing parameter comprises:

displaying an interactive parameter adjustment control at a position corresponding to the second touch operation in response to touch information of the second touch operation satisfying a preset trigger condition.

13. The method according to claim 12, wherein the adjusting the drawing parameter further comprises:

determining corresponding target drawing parameter by obtaining a corresponding interaction operation instruction of an interaction operation on the parameter adjustment control through the second touch operation.

14. The method according to claim 1, wherein the adjusting the drawing parameter comprises:

displaying a non-interactive parameter adjustment control in a drawing region of the graphical user interface in response to touch information of the second touch operation satisfying a preset trigger condition.

15. The method according to claim 14, wherein the parameter adjustment control comprises:

a horizontal axis representing a size of the drawing parameter; and a longitudinal axis representing a strength of the drawing parameter.

16. A terminal device, comprising:

a processor and a memory;

wherein the memory is configured to store a program, and the processor invokes the program stored in the memory to:

perform graph drawing on a graphical user interface in response to a first touch operation on the graphical user interface, wherein the first touch operation comprises a sliding operation, and the first touch operation is performed by a first finger of a user;

obtain a second touch operation on the graphical user interface in response to a dwelling action of the sliding operation, wherein the second touch operation is performed by a second finger of the user other than the first finger;

adjust a drawing parameter and/or switch a drawing function in response to touch information of the second touch operation satisfying a preset trigger condition; and continue to perform the graph drawing on the graphical user interface using the drawing parameter being adjusted and/or the drawing function being switched according to the first touch operation in response to ending of the second touch operation;

wherein, the touch information comprises a touch trajectory; and the processor invokes the program stored in the memory further to:

obtain a touch point corresponding to the dwelling action, a start touch point and a stop touch point corresponding to the second touch operation;

determine a projection of a distance between the start touch point and the stop touch point on an extension line of a line segment of the touch point and the start touch point, and a distance from the stop touch point to the extension line; and determine a target drawing parameter according to a length of the projection and the distance from the stop touch point to the extension line, wherein the target drawing parameter is the drawing parameter being adjusted.

17. The terminal device according to claim 16, wherein in process of adjusting the drawing parameter and/or switching the drawing function, a touch point corresponding to the dwelling action does not displace.

18. A non-transitory computer-readable storage medium, wherein a computer-executable instruction is stored in the computer-readable storage medium, and when executed by a processor, the computer-executable instruction is configured to:

perform graph drawing on a graphical user interface in response to a first touch operation on the graphical user interface, wherein the first touch operation comprises a sliding operation, and the first touch operation is performed by a first finger of a user;

obtain a second touch operation on the graphical user interface in response to a dwelling action of the sliding operation, wherein the second touch operation is performed by a second finger of the user other than the first finger;

adjust a drawing parameter and/or switch a drawing function in response to touch information of the second touch operation satisfying a preset trigger condition; and continue to perform the graph drawing on the graphical user interface using the drawing parameter being adjusted and/or the drawing function being switched according to the first touch operation in response to ending of the second touch operation;

wherein, the touch information comprises a touch trajectory; and the computer-executable instruction is further configured to:

obtain a touch point corresponding to the dwelling action, a start touch point and a stop touch point corresponding to the second touch operation;

determine a projection of a distance between the start touch point and the stop touch point on an extension line of a line segment of the touch point and the start touch point, and a distance from the stop touch point to the extension line; and determine a target drawing parameter according to a length of the projection and the distance from the stop touch point to the extension line, wherein the target drawing parameter is the drawing parameter being adjusted.

* * * * *